UNITED STATES PATENT OFFICE.

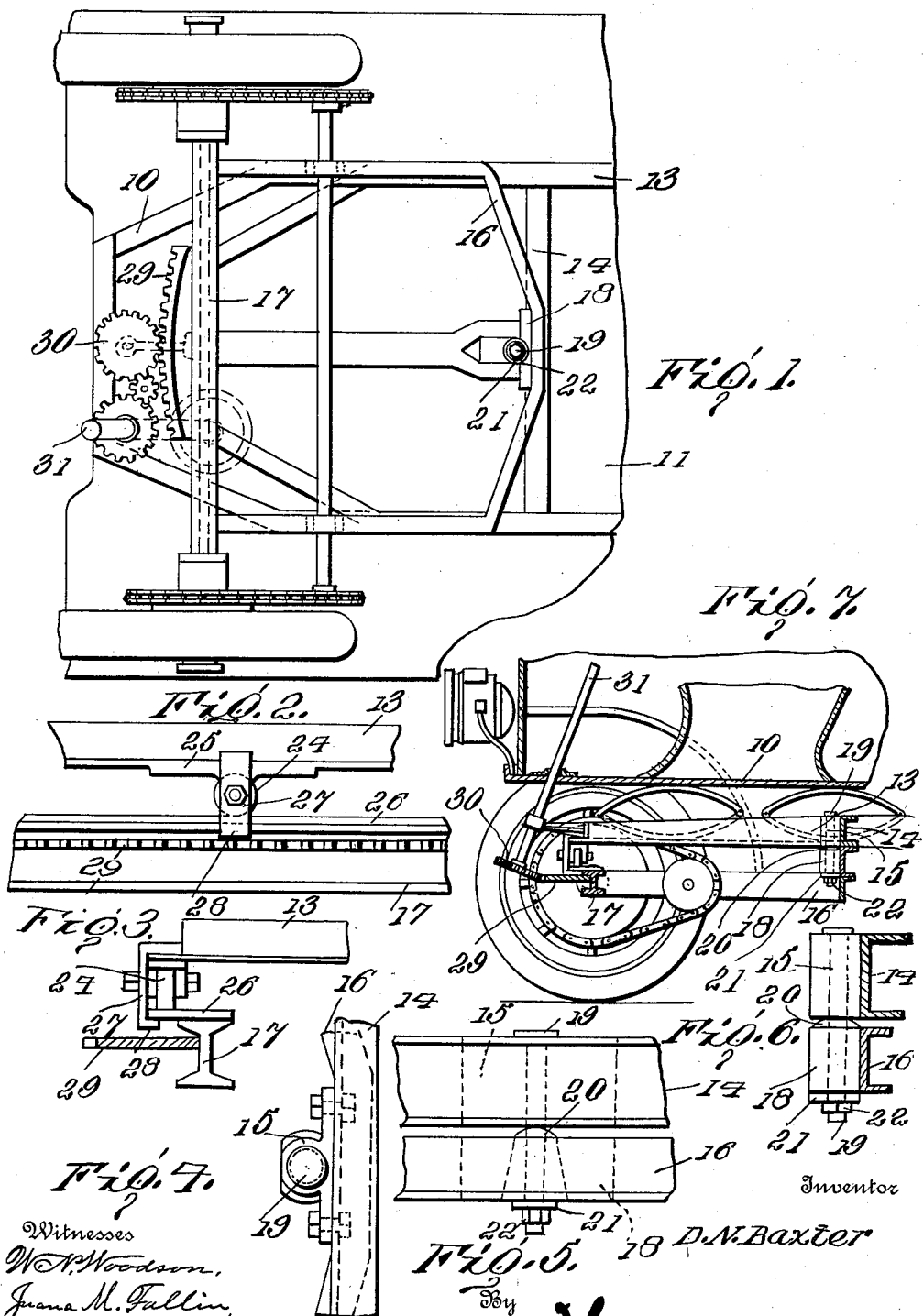

DANIEL N. BAXTER, OF ARDMORE, OKLAHOMA, ASSIGNOR TO DANIEL N. BAXTER, TRUSTEE, OF WICHITA, KANSAS.

FIFTH-WHEEL FOR MOTOR-VEHICLES.

1,007,262.     Specification of Letters Patent.     Patented Oct. 31, 1911.

Original application filed July 7, 1909, Serial No. 506,382. Divided and this application filed March 25, 1910. Serial No. 551,480.

*To all whom it may concern:*

Be it known that I, DANIEL N. BAXTER, a citizen of the United States, residing at Ardmore, in the county of Carter and State of Oklahoma, have invented certain new and useful Improvements in Fifth-Wheels for Motor-Vehicles, of which the following is a specification.

This invention relates to motor vehicles and refers particularly to an improved fifth wheel construction adapted to be employed in connection with the same and forms a divisional application from the application filed July 7, 1909, Serial No. 506,382 for improvements in automobiles.

An object of this invention is to provide a vehicle with pivoted frames which are permitted to vibrate freely relative to one another and to which the wheels are attached so that the wheels independently drop into depressions in the roadway and maintain constant traction therewith.

In this invention a further feature is to provide an improved fifth wheel whereby the hinged frames of the vehicle are retained in relation to one another and at the same time the various adjustments, necessary for the accommodation of the wheels to the depressions in the roadway, are permitted.

For a full understanding of the invention and the merits thereof and also to acquire a knowledge of the details of construction, reference is to be had to the following description and accompanying drawing, in which:

Figure 1 is a bottom plan view of the forward end of a motor vehicle having the improved fifth wheel applied thereto; Fig. 2 is a detailed fragmentary view of the forward ends of the frames disclosing the bearing roller supporting the same; Fig. 3 is a side elevation of the same; Fig. 4 is a top plan view of the connection between the swiveled frames, a fragmentary view of the same being disclosed; Fig. 5 is a rear elevation of the same; Fig. 6 is a side elevation thereof; and, Fig. 7 is a longitudinal vertical section through the forward end of the vehicle, showing the improved fifth wheel applied thereto.

Corresponding and like parts are referred to in the following description and indicated in all the views of the drawings by the same reference characters.

Referring to the drawings, the numeral 10 designates a frame upon which is mounted a suitable body 11. The frame 10 which is disclosed in part only in the drawings, is mounted upon a plurality of elliptic springs 12 which are in turn supported upon an upper frame 13 of the base of the vehicle. The frame 13 is provided with a transverse beam of angle iron 14 which supports intermediately thereof a bearing 15. The bearing 15 comprises an elongated portion of metal which is enlarged at its central portion and suitably apertured.

Disposed beneath the forward end of the frame 13 is a secondary frame or lower frame 16. The frame 16 is formed of angle iron and is of U-form, the extremities of the same terminating in the front axle 17 of the vehicle. The rear portion of the frame 16 is provided midway of its sides with a second bearing member 18 which is formed similarly to the bearing member 15 and is disposed in vertical alinement with the bearing member 15. A king bolt 19 engages through the openings formed in the bearings 15 and 18 and serves as a means for centering the frames 13 and 16. The bearing member 18 is provided with a convexed washer 20 which is formed of a disk of metal thickened at its central portion and which is suitably apertured for the reception of the king bolt 19 which is extended therethrough. The washer 20 is employed for the purpose of spacing apart the frames 13 and 16 and of permitting of the vibration of the frames out of the horizontal plane. For the purpose of permitting of this lateral vibration of the frames, the aperture formed through the bearing 18 is of conical formation, the same diverging downwardly to permit of the swinging of the lower end of the king bolt 19 incident to the vibration of the upper bearing 15. The lower extremity of the king bolt 19 is provided with a washer 21 which is held thereon and in engagement with the lower bearing 18 by the provision of a clamping nut 22.

As will be seen from Fig. 4, the flanges of the beams of angle iron are extended backwardly and the bearing members 15 and 18 are engaged against the forward or outer faces of the beams and are retained in engagement therewith by the provision of clamping bolts 23 which are secured through the apertured ends of the bearing members 15 and 18 and through the body portions of the beams.

For the purpose of supporting the lower frame 16 in spaced relation from the frame 13, a roller 24 is employed which is carried in a bracket 25, the bracket 25 being depended from the forward end of the frame 13, so as to dispose the roller 24 upon a bearing plate 26 carried by the axle 17. The bearing plate 26 is arcuate in form at its forward edge in order to conform to the arc through which the roller 24 is carried upon the lateral swinging of the lower frame 16, and the roller 24 is held in engagement against the plate 26 by the provision of a finger 27. The finger 27 is formed of a portion of metal which is depended from the forward end of the frame 13 and is provided at its lower extremity with an inwardly extended flange or lip 28 which engages beneath the forward edge of the plate 26. It will be noted from Fig. 3 that the plate 26 is projected forwardly a slight distance beyond the front axle 17 of the vehicle to permit of the engagement of the lip 28 with the plate 26. The front axle 17 is also provided with a segment 29 which is forwardly extended therefrom and which meshes with a gear 30 connected to the lower extremity of a steering post 31 by means of which the vehicle is directed in its movements.

The operation of the improved fifth wheel comprises the swinging of the lower frame 16 about the king bolt 19 as an axis, causing the roller 24 to pass over the upper face of the arcuate plate 26 and is caused to remain in contact beneath the frame 13 through the medium of the finger 27. When one of the forward wheels mounted upon the ends of the axle 17 drops into a depression in the roadway, the frame 16 is directed slightly downwardly at the side to which the wheel is carried. This action causes the washer 20 to slide over the under face of the bearing 15 and imparts an angled movement to the bearing member 18 which is permitted by the loose insertion of the king bolt 19 therethrough.

Having thus described the invention what is claimed as new is:

1. A motor vehicle including a main frame, a secondary frame of reduced length arranged beneath the forward end of the main frame, cylindrical bearing members carried upon the main frame and the rear end of the secondary frame for registration with one another, a conical washer interposed between the bearings, a king-bolt passing through the bearings and the washer, a bearing plate arranged across the forward end of the secondary frame and having an arcuate forward edge, a bracket depending from the main frame and overhanging the plate, a roller carried in the bracket engaging upon the plate, and a depending finger carried upon the bracket and having an inturned lip engaging loosely against the under side of the bearing-plate for holding the frames together.

2. A motor-vehicle including a main frame having a transverse brace spaced inwardly from the forward end thereof, a relatively short secondary frame carried beneath the forward end of the main frame and having a transverse bar at its rear end, registering bearing members carried upon the transverse brace of the main frame and the transverse bar of the secondary frame, a conical washer interposed between the bearings for effecting the rocking of the same, a king-bolt depending through the bearings and the washer, a bracket extending downward from the forward end of the main frame and having a depending finger with an inturned lip on its lower end, a roller carried in the bracket, a bearing-plate arranged horizontally across the forward end of the secondary frame and having an arcuate forward edge engaging against the depending finger and for the reception of the roller, and steering means carried upon the main frame and connected to the secondary frame for swinging the same.

In testimony whereof I affix my signature in presence of two witnesses.

DANIEL N. BAXTER. [L. S.]

Witnesses:
  RODOLPH HATFIELD,
  AD. N. JONES.

---

Copies of this patent may be obtained for five cents each, by addressing the "Commissioner of Patents, Washington, D. C."